United States Patent
Kim et al.

(10) Patent No.: US 10,318,059 B2
(45) Date of Patent: Jun. 11, 2019

(54) TOUCH SENSING SYSTEM AND METHOD OF CONTROLLING THE SAME

(71) Applicant: LG Display Co., Ltd., Seoul (KR)

(72) Inventors: Younggyu Kim, Paju-si (KR); Hyunsuk Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/817,253

(22) Filed: Nov. 19, 2017

(65) Prior Publication Data
US 2018/0150178 A1 May 31, 2018

(30) Foreign Application Priority Data
Nov. 25, 2016 (KR) .................. 10-2016-0158435

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ......... G06F 3/041; G06F 3/045; G01R 27/26; G06K 11/06; G08C 21/00
See application file for complete search history.

(56) References Cited

U.S. PATENT DOCUMENTS

| | | | | |
|---|---|---|---|---|
| 2013/0271396 | A1* | 10/2013 | Chen | G06F 3/0416 345/173 |
| 2014/0062907 | A1* | 3/2014 | Kim | G06F 3/038 345/173 |
| 2015/0035789 | A1* | 2/2015 | Brunet | G06F 3/0416 345/174 |
| 2016/0370413 | A1* | 12/2016 | Lu | G09G 3/006 |
| 2017/0045986 | A1* | 2/2017 | Hong | G06F 3/0416 |

* cited by examiner

*Primary Examiner* — Pegeman Karimi
(74) *Attorney, Agent, or Firm* — Polsinelli PC

(57) ABSTRACT

The present disclosure provides A touch sensing system comprising: a display panel having pixels and touch sensors; a display driving circuit that writes data to the pixels; a touch sensing part that senses touch input; a plurality of multiplexers that connect one of sensor lines connected to the touch sensing part; and a touch sensor controller that performs full sensing to detect a multiplexer with a sensed touch input by supplying a driving signal to the touch sensors within the touch sensing periods, performs pre-sensing to determine whether or not a touch input is sensed in multiplexers adjacent to the multiplexer with a sensed touch input, and performs local sensing to scan the touch sensors connected to the multiplexer with a sensed touch input based on the pre-sensing result and to calculate the coordinates of the touch input.

20 Claims, 20 Drawing Sheets

FIG. 10
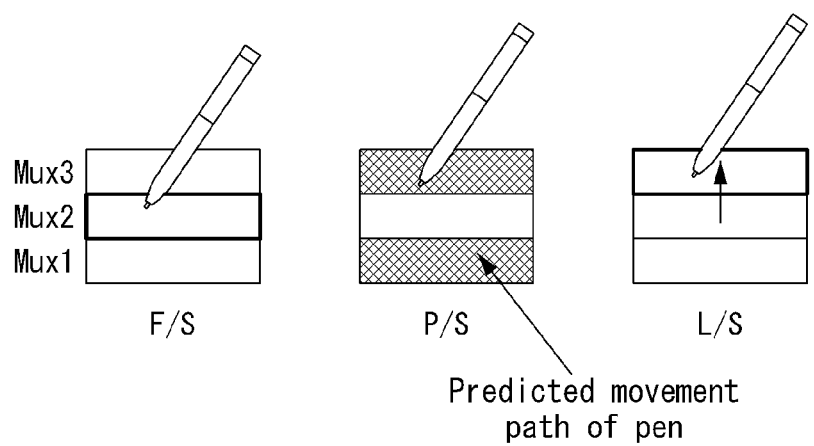
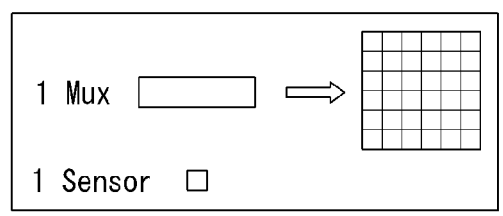

FIG. 15
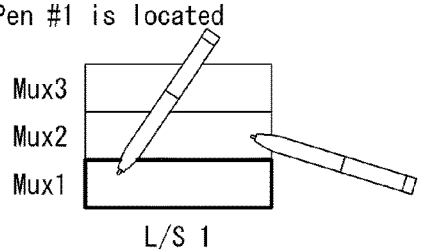
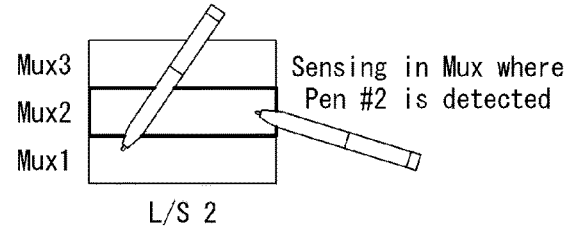

FIG. 16
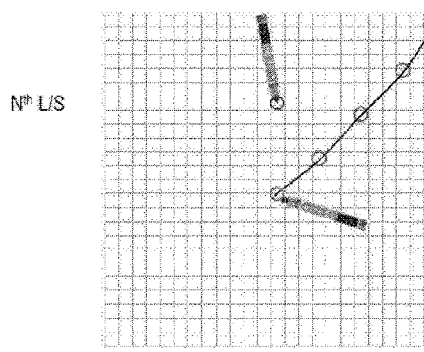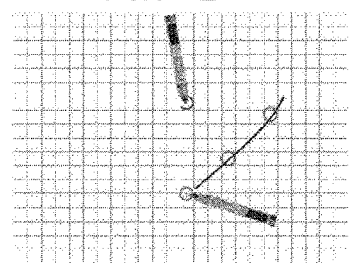

TOUCH SENSING SYSTEM AND METHOD OF CONTROLLING THE SAME

CROSS-REFERENCE TO RELATED APPLICATION

This application claims the priority benefit of Korean Patent Application No. 10-2016-0158435 filed on Nov. 25, 2016, which is incorporated herein by reference for all purposes as if fully set forth herein.

BACKGROUND

Field of the Disclosure

The present disclosure relates to a display device, and more particularly, to a touch sensing system and a method of controlling the same.

Description of the Background

User interfaces (UI) enable humans (users) to interact with various types of electrical and electronic devices and easily control them as desired. Typical examples of the user interfaces include keypads, keyboards, mice, on-screen displays (OSD), and remote controllers with an infrared communication capability or a radio frequency (RF) communication capability. The user interface technology is continuously developing to improve user sensation and ease of operation. Recently, user interfaces have been evolving into touch UI, voice recognition UI, 3D UI, etc.

A touch UI delivers a touchscreen on a display panel and senses touch input and sends user input to an electronic device. The touch UI is becoming increasingly indispensable in portable information appliances such as smart-phones, and moreover it is being extensively used in laptop computers, computer monitors, home appliances, etc.

Recently, stylus pens, as well as fingers, are widely used as a HID (human interface device) in smartphones, smart-books, etc. The stylus pens allow for more accurate input than fingers. There are two types of stylus pens: active and passive. With the passive stylus, touch position detection is difficult because the changes in capacitance at points where it touches the touchscreen are very subtle. With the active stylus, touch position detection is easier compared to the passive stylus because the active stylus itself generates a pen activation signal and outputs the signal at a point where it touches the touchscreen.

FIG. 1 shows a configuration in which input is provided to a touchscreen 100 using an active stylus pen 200.

The active stylus pen 200 generates a pen activation signal based on a touchscreen activation signal received by the touchscreen 100, and outputs the pen activation signal at a point where it touches the touchscreen 100, thus making it easy to detect the location of touch on the touchscreen 100. The active stylus pen 200 senses the pressure of touch on the touchscreen 100, modulates the pen activation signal based on sensed pressure information, and outputs a modulated pen activation signal reflecting the pressure information.

The touchscreen 100 performs a display function and a touch sensing function. The touchscreen 100 can sense touch when a conductive object such as a finger or the active stylus pen 200 comes into contact with it, and may have an integrated capacitive touch sensor. A technology in which touch sensors are embedded in a pixel array of a display panel (hereinafter called an "in-cell touch sensor") can be applied to the touchscreen 100.

The touchscreen 100 comprising a pixel array with in-cell touch sensors embedded in it is driven in a time-division manner in a display driving period and a touch sensor driving period. Data of an input image is written into the pixel array in the display driving period, and the in-cell touch sensors are driven to sense touch input in the touch sensor driving period.

FIGS. 2 to 4 are schematic views for explaining a touch sensing system that processes input on the touchscreen 100 to which the in-cell touch sensor technology is applied.

FIG. 2 is a view showing that, in the related art touch sensing system, 1 frame is time-divided into a display driving period and a touch sensor driving period. FIG. 3 is a control flow diagram of a touch sensing system according to the related art. FIG. 4 is a view showing a screen output operation of the touch sensing system according to the related art.

In the related art touch sensing system, 1 frame is time-divided into one or more display periods (shown in FIG. 2) D1 to D16 for driving the pixels and one or more touch sensor driving periods (shown in FIG. 2) F/S and L/S for driving the touch sensors.

The touch sensing system drives the touch sensors during a touch period in response to an externally-input, touch enable signal Beacon. The touch sensing system is able to increase a touch report rate compared to a frame rate by allocating at least two touch frames for driving the touch sensors C1 to C4 within 1 frame period.

As shown in FIG. 2, a plurality of display periods D1 to D16 and a plurality of touch periods F/S and L/S are divided into a plurality of intervals within one frame period, and the touch sensing system senses touch input for each touch period F/S and L/S and sends coordinate data of the touch input to a host system at a point in time when each touch frame is completed.

Referring to FIG. 3, in the related art touch sensing system, full sensing F/S is performed first to sense the location of touch input within the entire touch area, in response to a touch enable signal Beacon (P100). Through full sensing F/S, the presence of touch input in a MUX that receives touch input can be detected.

After that, local sensing L/S is performed to sense the coordinates of touch input based on the area in which touch input is present (P200). Local sensing L/S is performed only on the sensing area of the MUX that is detected as having received a touch input through full sensing F/S, to thereby calculate the coordinates of the touch input.

As shown in FIG. 4, full sensing F/S may be performed across the entire touchscreen to find a MUX that has received touch input. Because one MUX receives input from a plurality of touch sensors, an approximate location of touch input may be determined by finding a MUX that has received touch input through full sensing F/S.

After sensing a MUX that has received touch input, local sensing L/S may be performed only on the touch sensors that provide touch input to the corresponding MUX to check for the presence or absence of touch input and to calculate the coordinates of the touch input. Since local sensing L/S is performed only on the touch sensors that provide touch input to a specific MUX, it offers a faster processing speed than full sensing F/S and saves system resources.

However, the application of the related art touch sensing method has the following problems.

In FIG. 4, a touch sensing result for 1 Frame and a touch sensing result for 3 Frame shows no particular problem with outputting touch coordinates since the touch input is made within the area of the touch sensors that provide touch input to the MUX sensed by full sensing F/S.

On the other hand, a touch sensing result for 2 Frame shows the problem of loss of touch coordinates since the touch input is made outside the area of the touch sensors that provide touch input to the MUX sensed by full sensing F/S.

That is, during full sensing F/S, touch input can be sensed by the touch sensors that provide touch input to a specific MUX, whereas, if the touch input moves fast enough to greatly shift the location of the touch input within 1 frame period (16.7 ms), the touch input may move to the area of the touch sensors that provide touch input to another MUX at a point in time when local sensing L/S is performed after full sensing F/S. Local sensing L/S is performed only on the touch sensors that provide touch input to the MUX sensed through full sensing F/S just prior to local sensing L/S. Due to this, the touch sensor areas of other MUXes cannot be sensed at all. Therefore, among the touch input sensed for 1 through 3 Frames, the coordinates for 2 Frame may be lost, and the touch input line may be broken.

As stated above, the related art touch sensing method may be problematic in that the coordinates of touch input may be lost during operation if the touch input moves fast, and accordingly, the displayed touch input line may be broken intermittently.

By the way, the related art display devices have limitations in securing blanking intervals in the case of an increase in resolution, because an emission duty cycle is fixed depending on programming period Tw which is determined in accordance with a driving frequency. Thus, there is insufficient time to perform the functions that need to be executed during the blanking intervals, such as sensing brightness or current and performing control for better picture quality.

SUMMARY

An exemplary aspect of the present disclosure provides A touch sensing system comprising: a display panel having pixels connected to data lines and gate lines and a plurality of touch sensors connected to the pixels; a display driving circuit that writes data of an input image to the pixels in a plurality of display periods divided from 1 frame; a touch sensing part that senses touch input by driving the touch sensors during touch sensing periods within the 1 frame which are allocated between the display periods; a plurality of multiplexers that connect one of sensor lines connected to the plurality of touch sensors to the touch sensing part; and a touch sensor controller that performs full sensing to detect a multiplexer with a sensed touch input by supplying a driving signal to the touch sensors within the touch sensing periods, performs pre-sensing to determine whether or not a touch input is sensed in multiplexers adjacent to the multiplexer with a sensed touch input, and performs local sensing to scan the touch sensors connected to the multiplexer with a sensed touch input based on the pre-sensing result and to calculate the coordinates of the touch input.

The touch sensor controller performs pre-sensing to determine whether or not a touch input is sensed in neighboring multiplexers on either side of the multiplexer detected to have a sensed touch input through the full sensing.

If the pre-sensing result shows that no touch input is sensed in the multiplexers on either side, the touch sensor controller performs local sensing to scan the touch sensors connected to the multiplexer detected to have a sensed touch input through the full sensing and to calculate the coordinates of the touch input, and if the pre-sensing result shows that a touch input is sensed in at least one of the multiplexers on either side, the touch sensor controller performs local sensing to scan the touch sensors connected to the multiplexer detected to have a sensed touch input through the pre-sensing and to calculate the coordinates of the touch input.

The touch sensor controller performs pre-sensing to determine whether or not a touch input is sensed in the multiplexer detected to have a sensed touch input through the full sensing and in neighboring multiplexers on either side of the multiplexer with a sensed touch input.

If the pre-sensing result shows that a touch input is sensed in two or more multiplexers, the touch sensor controller performs local sensing to scan the touch sensors connected to each of the multiplexers with a sensed touch input and to calculate the coordinates of the two or more touch inputs.

The touch sensor controller performs pre-sensing to determine whether or not a touch input is sensed with respect to part of a signal that is received by the multiplexer detected to have a sensed touch input through the full sensing and neighboring multiplexers on either side of the multiplexer with a sensed touch input.

If the pre-sensing result shows that a touch input is sensed in two or more multiplexers, the touch sensor controller performs local sensing to scan the touch sensors connected to the multiplexers detected to have a sensed touch input through the pre-sensing.

As few pulses as possible are allocated for the pre-sensing period, out of all the pulses for local sensing.

Another aspect of the present disclosure provides a touch sensing method, which writes data of an input image to the pixels in a plurality of display periods divided from 1 frame, and senses touch input by driving the touch sensors during touch sensing periods within the 1 frame which are allocated between the display periods, the method comprising: performing full sensing to detect a multiplexer with a sensed touch input by supplying a driving signal to the touch sensors within the touch sensing periods; performing pre-sensing to determine whether or not a touch input is sensed in multiplexers adjacent to the multiplexer with a sensed touch input; and performing local sensing to scan the touch sensors connected to the multiplexer with a sensed touch input based on the pre-sensing result and to calculate the coordinates of the touch input.

A further aspect of the present disclosure provides a touch sensing system comprising a plurality of touch sensors disposed at a plurality of pixels; a touch sensing part sensing a touch input by driving the touch sensors during a plurality of touch sensing periods within the 1 frame allocated in the display periods; a plurality of multiplexers connected to the touch sensing part and the touch sensors, each multiplexer connected to the plurality of touch sensors; and a touch sensor controller performing full sensing to locate a first multiplexer that received a touch input corresponding to a sensing area during the touch sensing periods, performing pre-sensing to determine if second and third multiplexers adjacent to the first multiplexer received the touch input, and performing local sensing calculate coordinates of the sensing area corresponding to at least one of the first, second and third multiplexers that received the touch input.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings:

FIGS. 10 and 11 are views showing a screen output operation of the touch sensing system according to an aspect of the present disclosure;

FIGS. 15 and 16 are views showing a screen output operation of the touch sensing system according to another aspect of the present disclosure;

DETAILED DESCRIPTION

Figure 1:
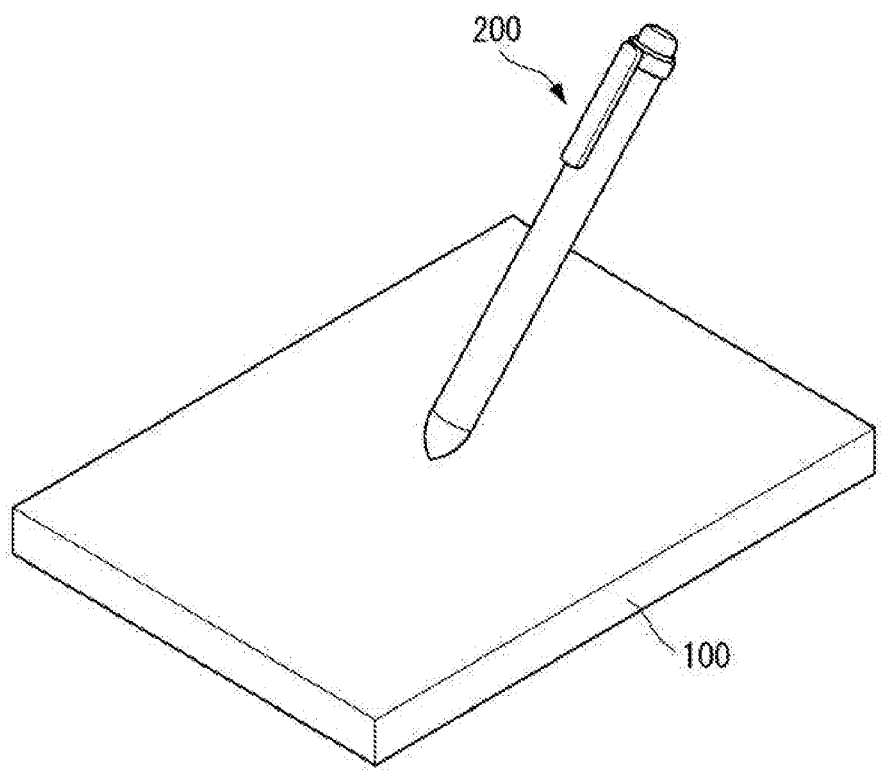
FIG. 1 is a view schematically showing a touch sensing system.
Figure 2:
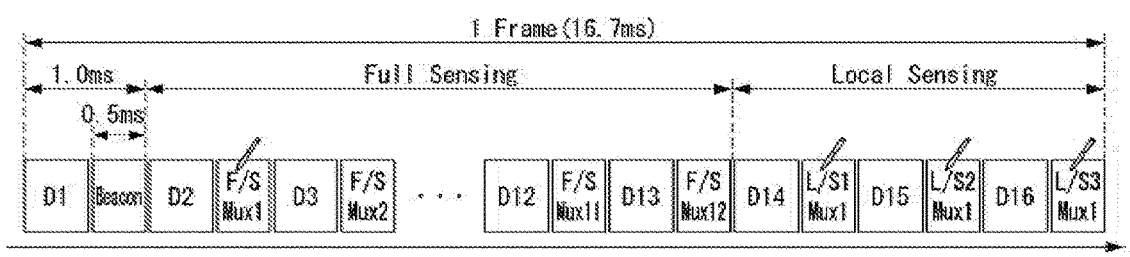
FIG. 2 is a view showing how 1 frame is time-divided into display driving periods and touch sensor driving periods according to the related art.
Figure 3:
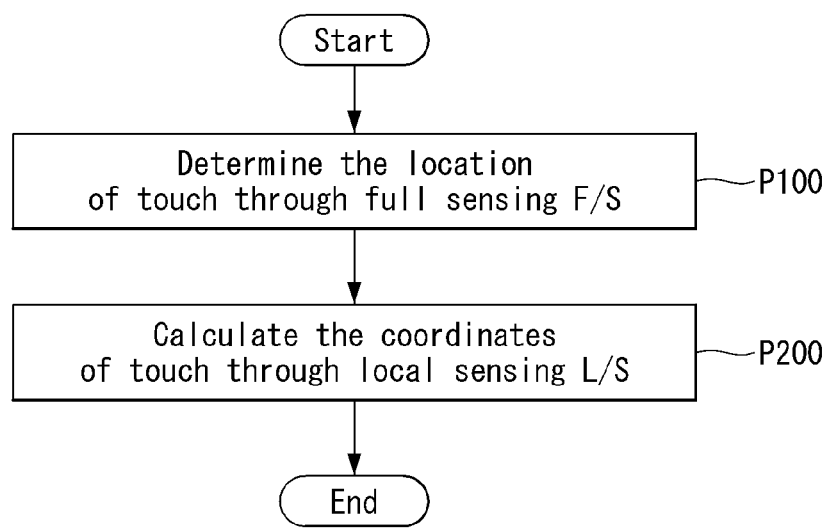
FIG. 3 is a control flow diagram of a touch sensing system according to the related art.
Figure 4:
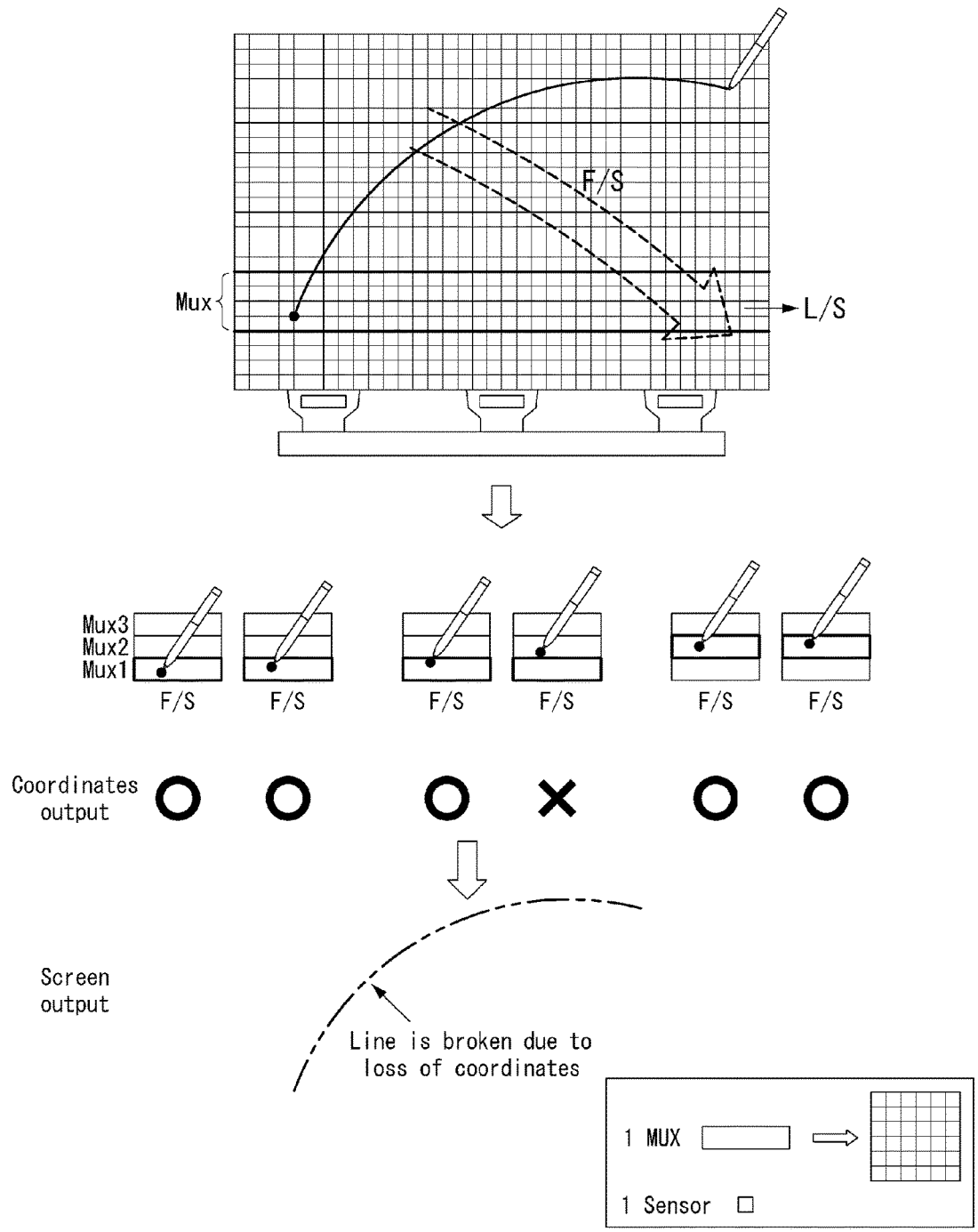
FIG. 4 is a view showing a screen output operation of the touch sensing system according to the related art.

Reference will now be made in detail to aspects, examples of which are illustrated in the accompanying drawings.

Hereinafter, exemplary aspects of the present disclosure will be described in detail with reference to the attached drawings. Throughout the specification, like reference numerals denote substantially like components. In describing the present disclosure, a detailed description of known functions or configurations related to the present disclosure will be omitted when it is deemed that they may unnecessarily obscure the subject matter of the present disclosure.

A display device of the present disclosure may be implemented as a flat-panel display such as a liquid crystal display (LCD), an organic light-emitting display (OLED display), etc. Although the following exemplary aspect will be described with respect to a liquid crystal display as an example of a flat-panel display, the present disclosure is not limited to this. For example, a display device of the present disclosure may be any type of display device to which the in-cell touch sensor technology is applicable.

A touch sensor of the present disclosure may be implemented as a capacitive touch sensor that can be embedded into a pixel array—for example, a mutual capacitance sensor or a self-capacitance sensor. While the following description of the touch sensor will be given below with respect to the self-capacitance sensor, the present disclosure is not limited to it.

Figure 5:
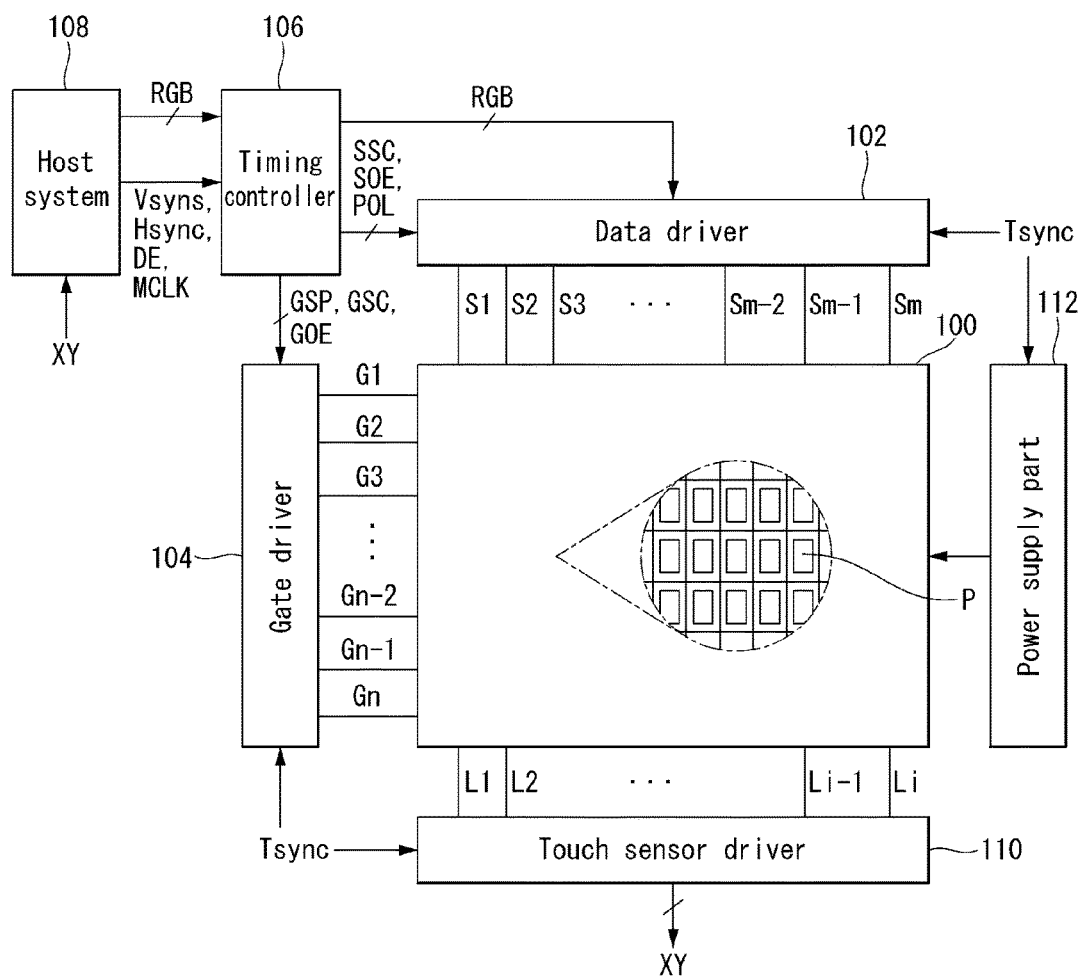
FIG. 5 is a block diagram schematically showing a touchscreen to which the in-cell touch technology is applied.
Figure 6:
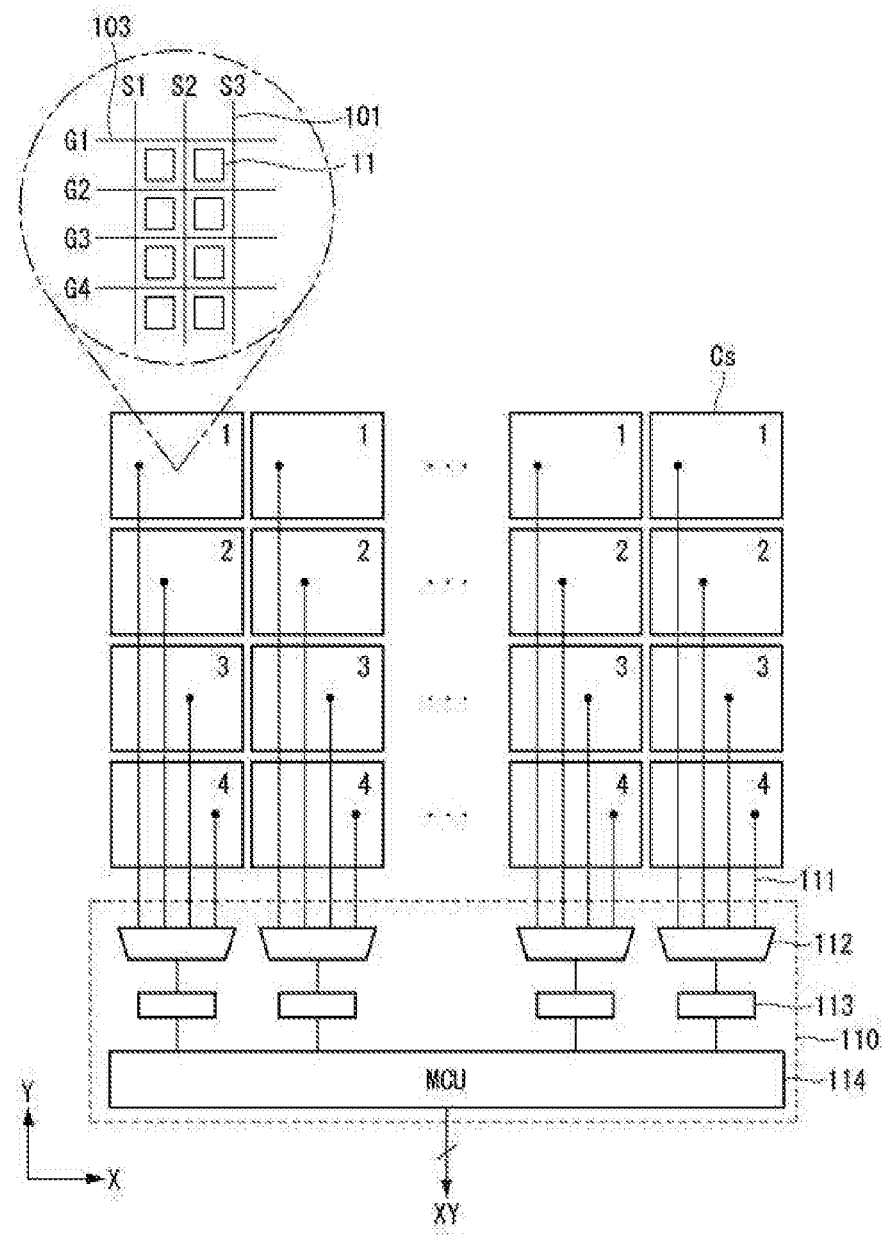
FIG. 6 is a view showing a planar arrangement of in-cell type touch sensors and a circuit configuration of a touch sensor driver.

FIG. 5 is a block diagram schematically showing a touchscreen to which the in-cell touch technology is applied. FIG. 6 is a view showing a planar arrangement of in-cell type touch sensors and a circuit configuration of a touch sensor driver. The touchscreen to which the in-cell touch technology is applied is driven in a time-division manner in a display driving period and a touch sensor driving period. Data of an input image is written into the pixel array in the display driving period. The in-cell touch sensors are driven to sense touch input in the touch sensor driving period.

Referring to FIGS. 5 and 6, a touchscreen 100 to which the in-cell touch technology is applied comprises display drivers 102, 104, 106, and 112 that write data signals of an input image to pixels P, and a touch sensor driver 110 that drives touch sensors.

The display drivers 102, 104, 106, and 112 and the touch sensor driver 110 are synchronized with each other in response to a synchronization signal Tsync. The display drivers 102, 104, 106, and 112 write data of an input image to the pixels P in the display driving period. During the touch sensor driving period, the pixels P hold data voltages stored in the display driving period, because the pixel TFTs are in the off state during the touch sensor driving period. The display drivers 102, 104, 106, and 112 comprise a data driver 102, a gate driver 104, a power supply part 112, and a timing controller 106.

In the display driving period, the data driver 120 converts digital video data RGB of an input image received from the timing controller 106 to analog negative/positive gamma-compensated voltages to output data voltages. The data voltages output from the data driver 102 are supplied to data lines S1 to Sm.

In the display driving period, the gate driver 104 sequentially supplies scan pulses to scan lines (also referred to as gate lines) G1 to Gn in synchronization with the data voltages and select lines on the display panel 100 to write the data voltages to. In the touch sensor driving period, the gate driver 104 turns off the pixels P by supplying an emission pulse of off level simultaneously to emission lines to cut off a drive current applied to the pixels P in the touch sensor driving period.

In the display driving period, the power supply part 112 supplies a DC current to power terminals of the pixels P via power-supply lines.

The timing controller 106 receives timing signals, such as a vertical synchronization signal Vsync, a horizontal synchronization signal Hsync, a data enable signal DE, and a main clock MCLK, from a host system 108, and synchronizes the operation timings of the data driver 102 and gate driver 104. A scan timing control signal comprises a gate start pulse GSP, a gate shift clock GSC, a gate output enable signal GOE, etc. A data timing control signal comprises a source sampling clock SSC, a polarity control signal POL, a source output enable signal SOE, etc.

The host system 108 may be implemented as any one of the following: a television system, a set-top box, a navigation system, a DVD player, a Blu-ray player, a personal computer PC, a home theater system, and a phone system. The host system 108 sends the timing signals Vsync, Hsync, DE, and MCLK, along with the digital video data RGB of the input image, to the timing controller 106. Moreover, the host system 108 executes an application associated with coordinate data XY of a touch input from the touch sensor driver 110.

The timing controller 106 or the host system 108 may generate a synchronization signal Tsync for synchronizing the display drivers 102, 104, 106, and 112 and the touch sensor driver 110.

In the touch sensor driving period, the touch sensor driver 110 supplies a touch driving signal to in-cell touch sensors.

In the touch sensing period, the touch sensor driver 110 drives the touch sensors in response to the synchronization signal Tsync input from the timing controller 106 or host system 108. In the touch sensing period, the touch sensor driver 110 supplies the touch driving signal to sensor lines L1 to Li to sense touch input. The touch sensor driver 100 detects touch input by analyzing the amount of charge change at the touch sensors which varies depending on the presence or absence of touch input, and calculates the coordinates of the touch position. The coordinate data of the touch position is sent to the host system 108.

FIG. 6 is a view showing a planar arrangement of in-cell type touch sensors and a circuit configuration of the touch sensor driver 100.

Referring to FIG. 6, touch sensor electrodes C1 to C4 each may be formed from a pattern where a common electrode is split and connected to a plurality of pixels.

The touch sensor driver 110 may convert the amount of electric charge in the touch sensors Cs into digital data to generate touch raw data (hereinafter, touch data). The touch sensor driver 110 calculates the coordinates of each touch input by executing a well-known touch sensing algorithm. The touch sensing algorithm determines whether a touch input is made by comparing touch data with a preset threshold, and adds an identification code and coordinate data XY to each touch input and sends them to the host system 108.

A sensing part 113 changes the touch sensor driving frequency which varies with the noise level in the touch sensors. The touch sensor driver 110 senses the amount of charge change at the touch sensors based on the touch sensor driving frequency. The touch sensor driver 110 measures the amount of electric charge flowing in through a finger or conductive object by the touch sensors Cs during a noise measurement period, and measures the noise level, which is in proportion to the amount of electric charge, by comparing it to the previous noise level.

The touch sensor driver 110 comprises a multiplexer (MUX) 112, a sensing part 113, and a touch sensor controller 114.

The multiplexer 112 reduces the number of channels of the touch sensor driver 110 by connecting the channels of the touch sensor driver 110 to sensor lines 111 under the control of the touch sensor controller 114.

The sensing part 113 amplifies the amount of electric charge in the touch sensors by using an amplifier, an integrator, an analog-to-digital converter (hereinafter, "ADC"), etc., and sends it to the ADC.

The touch sensor controller 114 executes the touch sensing algorithm to determine whether a touch input is made. The touch sensing algorithm compares touch data received from the ADC to a threshold during a touch input sensing period and determines the location of touch input based on the comparison result, and outputs the identification code and coordinate data XY of each touch input.

The touch sensor controller 114 compares noise data (hereinafter, "current noise") received from the ADC 113 during a noise measurement period with noise data (hereinafter, "previous noise") measured during the previous noise measurement period, and if the current noise is larger than the previous noise, changes the frequency of the touch sensor driving signal according to a preset rule. If the current noise level is lower than the previous noise level, the touch sensor controller 114 maintains the frequency of the touch sensor driving signal at the current frequency. The previous noise is stored in the memory of the touch sensor controller 114 and delayed so that it can be compared to the current noise. The touch sensor controller 114 may be implemented by a micro control unit (hereinafter, "MCU"). In FIG. 6, S1 to S3 denote data lines 101, and G1 to G4 denote gate lines 103.

Figure 7:
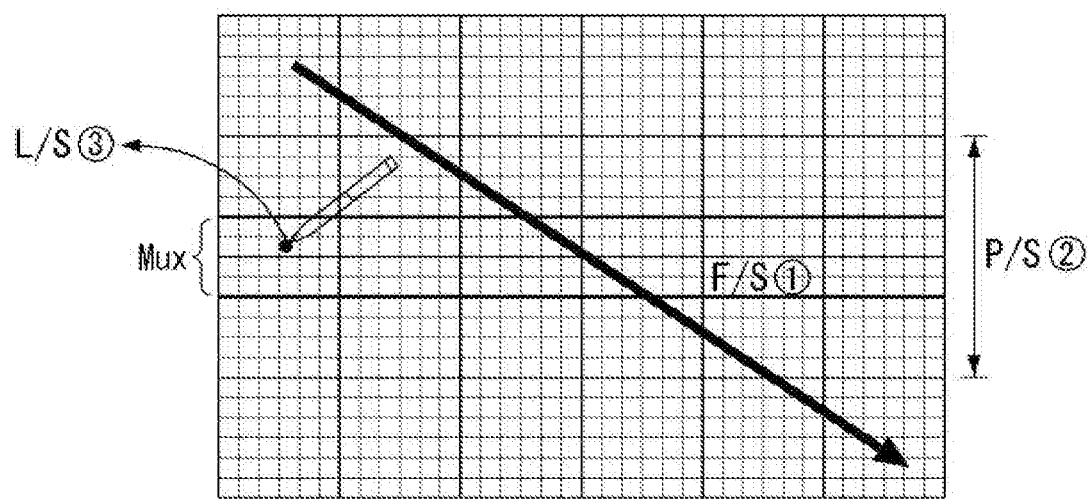
FIG. 7 is a view schematically showing sensing areas on the touchscreen according to a touch sensing process of the present disclosure.
Figure 8:
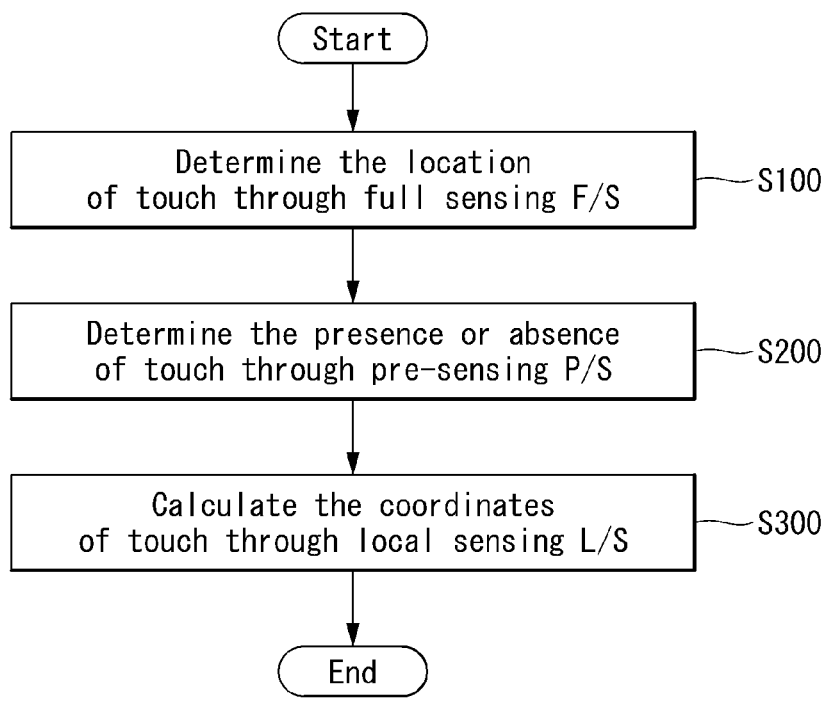
FIG. 8 is a control flow diagram of a touch sensing system according to the present disclosure.

FIGS. 7 and 8 are views for explaining a touch sensing process according to the present disclosure. FIG. 7 is a view schematically showing sensing areas on the touchscreen according to a touch sensing process of the present disclosure. FIG. 8 is a control flow diagram of a touch sensing system according to the present disclosure.

Referring to FIGS. 7 and 8, the touch sensing system performs full sensing F/S first to sense the location of touch input within the entire touch area (S100). As shown in FIG. 7, full sensing F/S may be performed across the entire touchscreen to find a MUX that has received touch input. Because one MUX receives input from a plurality of touch sensors, an approximate location of touch input may be determined by finding a MUX that has received touch input through full sensing F/S.

After sensing a MUX that has received touch input, pre-sensing P/S may be performed (S200). Pre-sensing P/S is to determine whether or not the location of touch input has moved to a MUX adjacent to the MUX that has received touch input. Pre-sensing P/S is carried out to determine whether or not a fast moving touch input is outside the MUX that has received touch input. This determines the presence of touch input in a MUX adjacent to the MUX that is detected as having received a touch input through full sensing F/S, as shown in FIG. 7.

According to the pre-sensing (P/S) result, local sensing L/S is performed to detect touch input in the sensing area of the MUX with touch input and to calculate the coordinates (S300). Local sensing L/S allows for detecting touch input only in the sensing area of the MUX that is detected as having received a touch input through pre-sensing P/S, and also allows for calculating the coordinates according to the detected value.

As described above, in the present disclosure, the current location of touch input is detected again by performing pre-sensing P/S prior to local sensing L/S which is done to calculate the coordinates after completion of full sensing F/S. This prevents the loss of the coordinates of a fast moving touch input.

Figure 9:
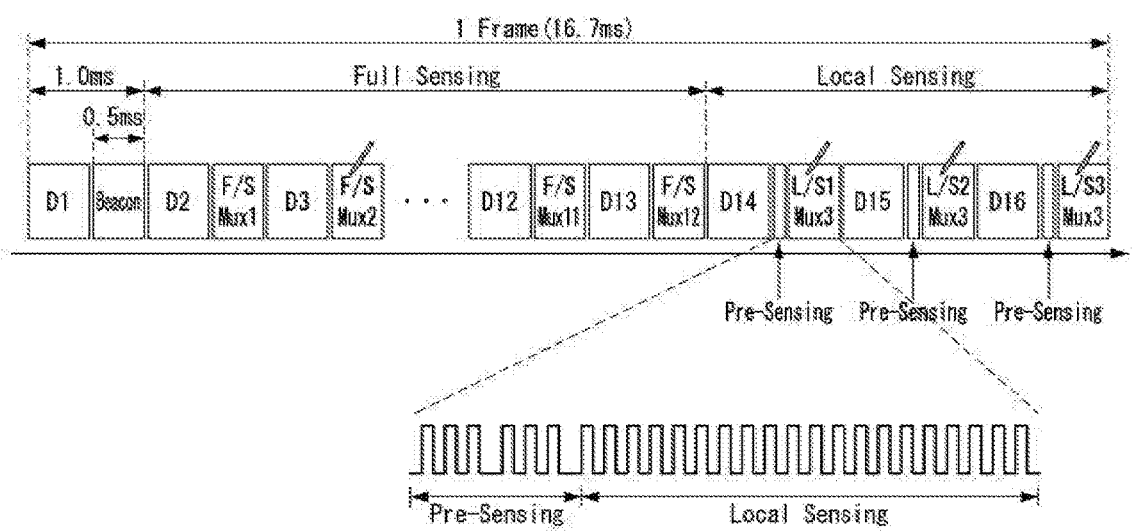
FIG. 9 is a view showing how 1 frame is time-divided into display driving periods and touch sensor driving periods according to an aspect of the present disclosure.
Figure 11:
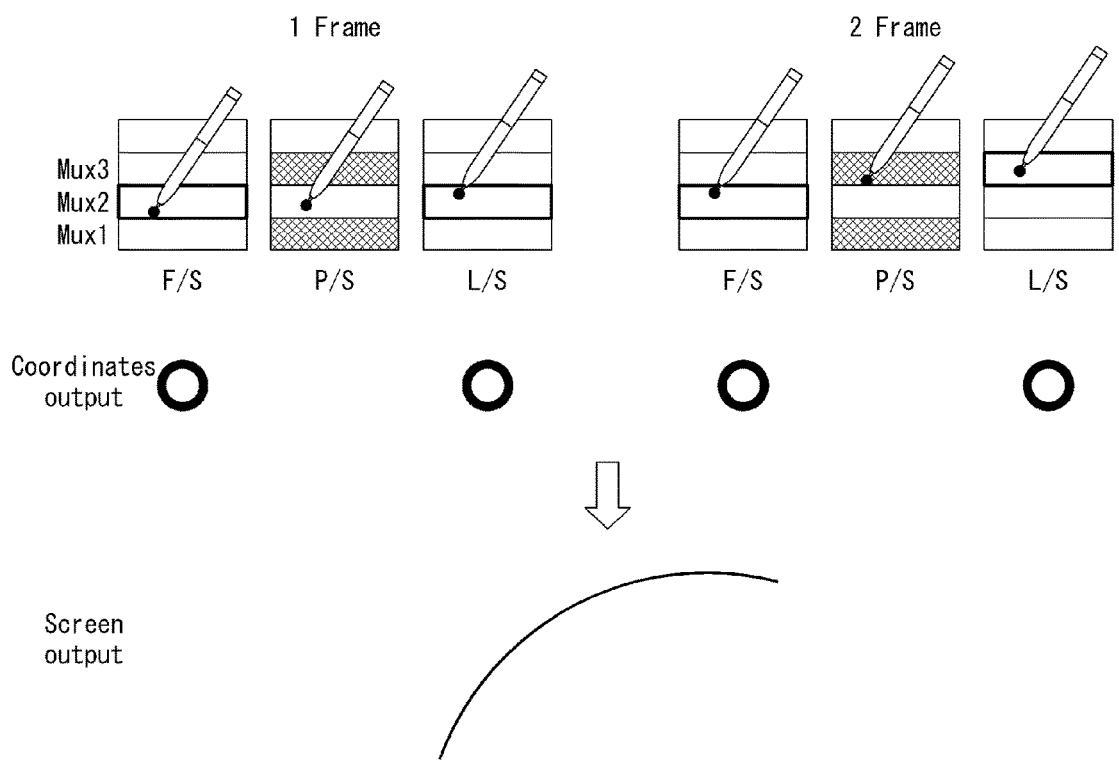

FIGS. 9 to 11 are views for explaining a touch sensing method according to an aspect of the present disclosure. FIG. 9 is a view showing how 1 frame is time-divided into a display driving period and a touch sensor driving period according to an aspect of the present disclosure. FIGS. 10 and 11 are views showing a screen output operation of the touch sensing system according to an aspect of the present disclosure.

Referring to FIGS. 9 and 10, in the touch sensing system, 1 frame is time-divided into one or more display periods D1 to D16 for driving the pixels and one or more touch sensor driving periods F/S, P/S, and L/S for driving the touch sensors. The touch sensing system drives the touch sensors during a touch period in response to an externally-input, touch enable signal Beacon.

The touch sensing system performs full sensing F/S first to sense the location of touch input within the entire touch area. Full sensing F/S may be performed across the entire touchscreen to sequentially find MUXes that have received touch input, from among MUX1, MUX2, . . . , MUX12.

Once a touch input is sensed in MUX2 through full sensing F/S, pre-sensing P/S is performed just prior to local sensing L/S which is carried out to calculate the touch coordinates. Pre-sensing P/S may be performed in such a way as to check for the presence of touch input in MUX1 and MUX3 adjacent to MUX2, but not in MUX2 which is detected as having received a touch input through full sensing F/S. Pre-sensing P/S is executed to determine whether or not a fast moving touch input is outside the MUX that has received touch input. This determines the presence of touch input in MUX1 and MUX3 on either side of MUX2 which is detected as having received a touch input through full sensing F/S, as shown in FIG. 10.

According to the pre-sensing (P/S) result, local sensing L/S is performed to detect touch input in the sensing area of the MUX with touch input and to calculate the coordinates.

As shown in FIGS. 9 and 10, local sensing L/S allows for detecting touch input only in the sensing area of the MUX that is detected as having received a touch input through pre-sensing P/S, and also allows for calculating the coordinates according to the detected value. As such, a touch input is sensed in the sensing area of MUX2 during full sensing F/S, and the movement of the touch input from MUX2 to MUX3 is sensed during pre-sensing P/S. Thus, the coordinates of the touch input can be calculated from the sensing area of MUX3.

As described above, in the present disclosure, the current location of touch input is detected again by performing pre-sensing P/S prior to local sensing L/S which is performed to calculate the coordinates after completion of full sensing F/S. This prevents the loss of the coordinates of a fast moving touch input.

Since only the presence of touch input is detected during a pre-sensing period P/S, the minimum number of pulses can be allocated for pre-sensing P/S, out of all the pulses for local sensing L/S. That is, the pre-sensing period P/S is designed to be only above a threshold, to such an extent that the presence or absence of touch input is detected, since it is not a period like a local sensing period L/S, in which the coordinates are calculated. This can minimize time loss during the local sensing period L/S.

As described above, according to an aspect of the present disclosure, pre-sensing P/S is performed prior to local sensing L/S which is performed to calculate the coordinates after completion of full sensing F/S. This prevents the loss of the coordinates of a fast moving touch input.

Referring to FIG. 11, if the full sensing F/S result shows that a touch input is sensed for a period of 1 frame in the sensing area of MUX2, pre-sensing P/S is performed to check for the presence of touch input in MUX1 and MUX3 on either side of MUX2 with a sensed touch input. The pre-sensing result shows that the touch input stays within the sensing range of MUX2, and it is therefore determined that there is no touch input in MUX1 and MUX3. As such, local sensing L/S may be performed only on the area of MUX2 with a sensed touch input, to thereby calculate the coordinates of the touch input.

If the full sensing F/S result shows that a touch input is sensed for a period of 2 frames in the sensing area of MUX2, pre-sensing P/S is performed to check for the presence of touch input in MUX1 and MUX3 on either side of MUX2 with a sensed touch input. The pre-sensing P/S result shows that the touch input has moved to MUX3 and is in the area of MUX3. As such, local sensing L/S may be performed only on the area of MUX3 which is detected as having received a touch input through pre-sensing P/S, to thereby calculate the coordinates of the touch input.

As described above, during full sensing F/S, touch input can be sensed by the touch sensors that provide touch input to a specific MUX, whereas, if the touch input moves fast enough to greatly shift the location of the touch input within 1 frame period (16.7 ms), the touch input may move to the area of the touch sensors that provide touch input to another MUX at a point in time when local sensing L/S is performed after full/sensing F/S. As such, in the present disclosure, a MUX with a sensed touch input is detected again by predicting the movement path of the touch input just prior to local sensing L/S and performing pre-sensing P/S only on corresponding MUXes, and then the coordinates are calculated through local sensing L/S according to the sensing result.

According to another aspect of the present disclosure, it is possible to generate touch coordinate data without loss of touch coordinates even in the presence of two touch inputs Pen #1 and Pen #2. A touch sensing method according to another aspect of the present disclosure can be applied to a process for the MCU 114 of the touch sensor driver 110 to generate touch coordinate data.

Figure 12:
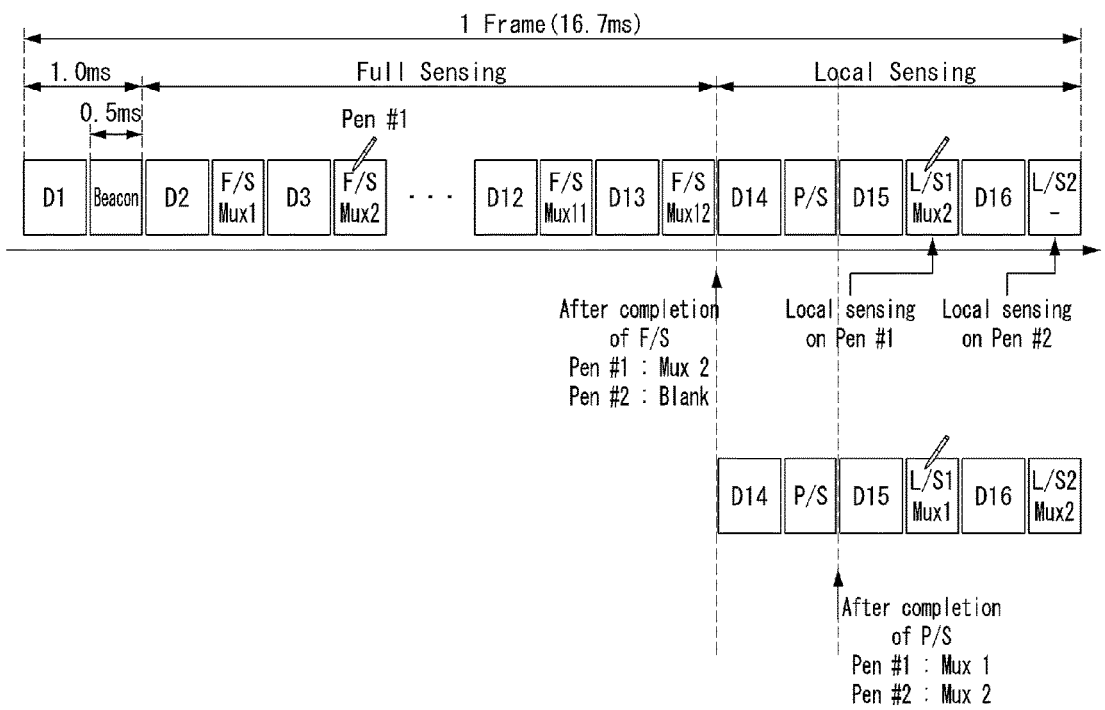
FIG. 12 is a view showing how 1 frame is time-divided into display driving periods and touch sensor driving periods according to another aspect of the present disclosure.
Figure 13:
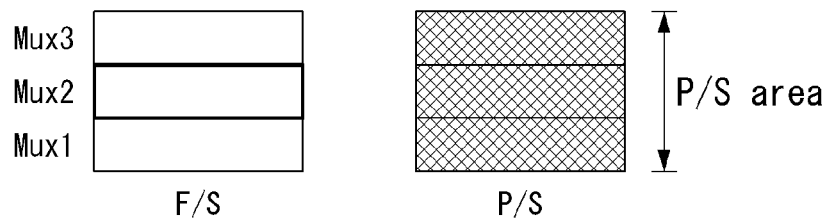
FIGS. 13 and 14 are views schematically showing sensing areas according to another aspect of the present disclosure.
Figure 14:
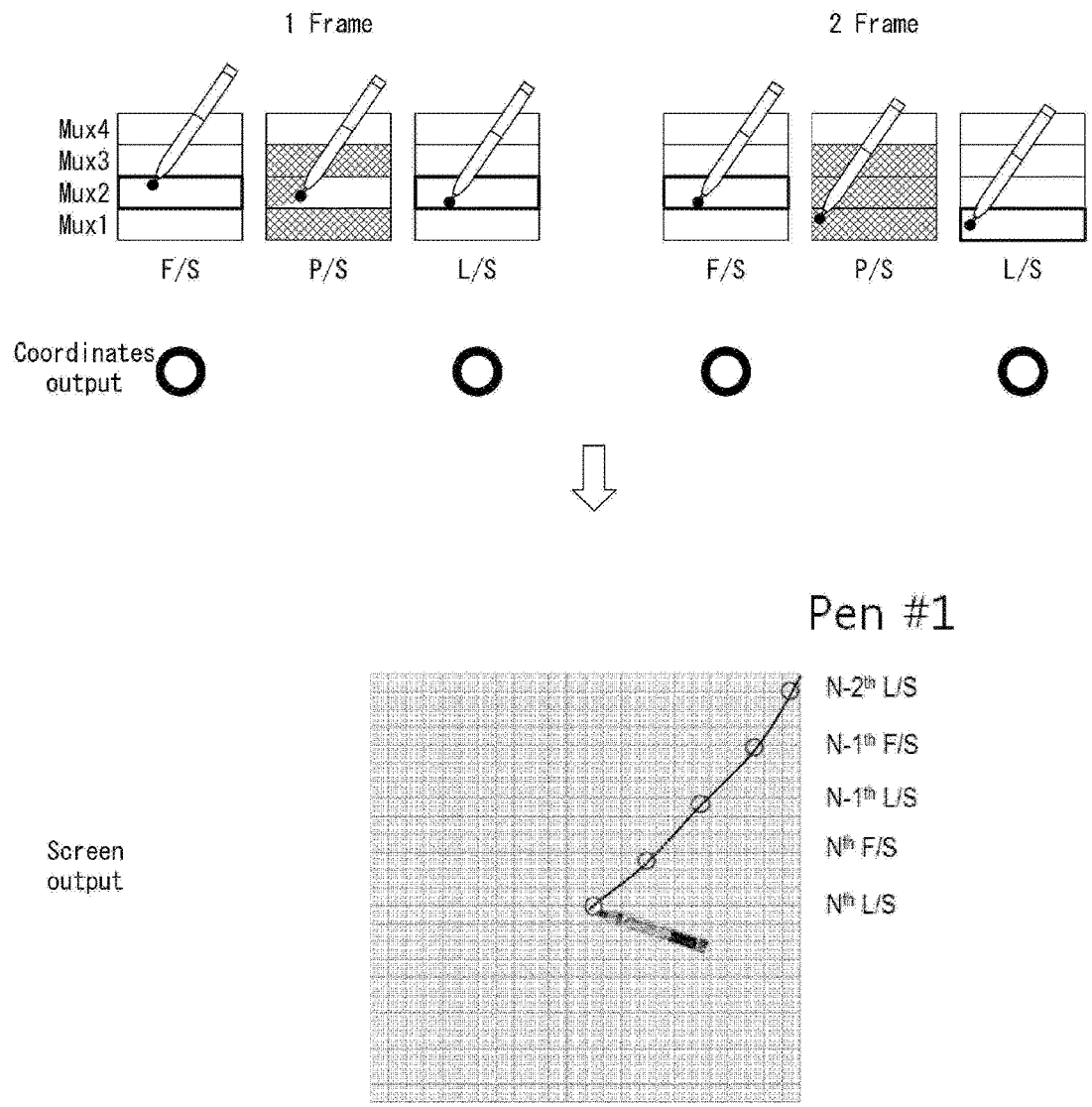

FIG. 12 is a view showing how 1 frame is time-divided into a display driving period and a touch sensor driving period according to another aspect of the present disclosure. FIGS. 13 and 14 are views schematically showing sensing areas according to another aspect of the present disclosure.

Referring to FIG. 12, in the touch sensing system, 1 frame is time-divided into one or more display periods D1 to D16 for driving the pixels and one or more touch sensor driving periods F/S, P/S, and L/S for driving the touch sensors. The touch sensing system drives the touch sensors during a touch period in response to an externally-input, touch enable signal Beacon.

The touch sensing system performs full sensing F/S first to sense the location of touch input within the entire touch area. Full sensing F/S may be performed across the entire touchscreen to sequentially find MUXes that have received touch input, from among MUX1, MUX2, . . . , MUX12.

The first touch input Pen #1 may be sensed through full sensing F/S, and then the touch sensing system may proceed to a local sensing period L/S to calculate the touch coordinates, without the second touch input Pen #2 being sensed.

Pre-sensing P/S is performed just prior to local sensing L/S. As shown in FIG. 13, a pre-sensing operation P/S according to another aspect of the present disclosure may be performed in such a way as to check for the presence of touch input in MUX1 and MUX3 as well as in MUX2 which is detected as having received the first touch input Pen #1 through full sensing F/S. That is, the aspect of the present disclosure shown in FIG. 9 involves checking for the presence of touch input in MUX1 and MUX3, but not in MUX2 which has received touch input, whereas another aspect for processing the two touch inputs Pen #1 And Pen #2 involves checking for the presence of touch input in all of MUX1, MUX2, and MUX3.

If the first touch input Pen #1 is still sensed after pre-sensing P/S, local sensing L/S1 may be performed on the area of MUX2 which has received the first touch input Pen #1, to thereby calculate the coordinates of the first touch input Pen #1. After that, pre-sensing P/S may be performed just prior to the next local sensing L/S2 to check for the presence of touch input in MUX1, MUX2, and MUX3.

Referring to FIG. 14, if both the full sensing F/S result and the pre-sensing P/S result show that a touch input is sensed for a period of 1 frame in the sensing area of MUX2, local sensing L/S may be performed on the area of MUX2 to calculate the coordinates of the touch input. If the full sensing F/S result shows that a touch input is sensed for a period of 2 frames in the sensing area of MUX2 and the pre-sensing P/S result shows that a touch input is sensed for a period of 2 frames in the sensing area of MUX1, local sensing L/S may be performed on the area of MUX1 to calculate the coordinates of the touch input.

Referring to FIG. 15, if the pre-sensing P/S result shows that MUX1 and MUX2 each have touch input, it may be determined that the first touch input Pen #1 has moved from MUX2 which has received it to the area of MUX1, and the second touch input Pen #2 starts at MUX2.

Accordingly, local sensing L/S may be performed on the area of MUX1 to output the coordinates of the first touch input Pen #1 and on the area of MUX2 to output the coordinates of the second touch input Pen #2.

As shown in FIG. 15, the local sensing L/S may be performed in such a way that first local sensing L/S1 is performed on the area of MUX1 to output the coordinates of the first touch input Pen #1 and second local sensing L/S2 is performed on the area of MUX2 to output the coordinates of the second touch input Pen #2.

FIG. 16 illustrates a screen that generates touch coordinate data without loss of touch coordinates even in the presence of two touch inputs Pen #1 and Pen #2 according to another aspect of the present disclosure.

Referring to FIG. 16, full sensing F/S, pre-sensing P/S, and local sensing L/S are sequentially performed to generate touch coordinate data. In this way, it is sensed that the second touch input Pen #2 starts just prior to Nth local sensing L/S while the first touch input Pen #1 is moving, and the location of the second touch input Pen #2 may be calculated and displayed as well upon the Nth local sensing L/S. Thus, the ID of each pen may be tracked during pre-sensing P/S, thereby preventing input errors.

According to yet another aspect of the present disclosure, it is possible to generate touch coordinate data without loss of touch coordinates even in the presence of three or more touch inputs Pen #1, Pen #2, and Pen #3. To this end, in yet another aspect of the present disclosure, pre-sensing P/S is performed by varying the MUX configuration to the area of MUX1.5 to MUX2.5 and the area of MUX2.5 to MUX3.5. Therefore, the presence or absence of touch input can be sensed in as many MUXes as possible in the shortest time possible.

Figure 17:
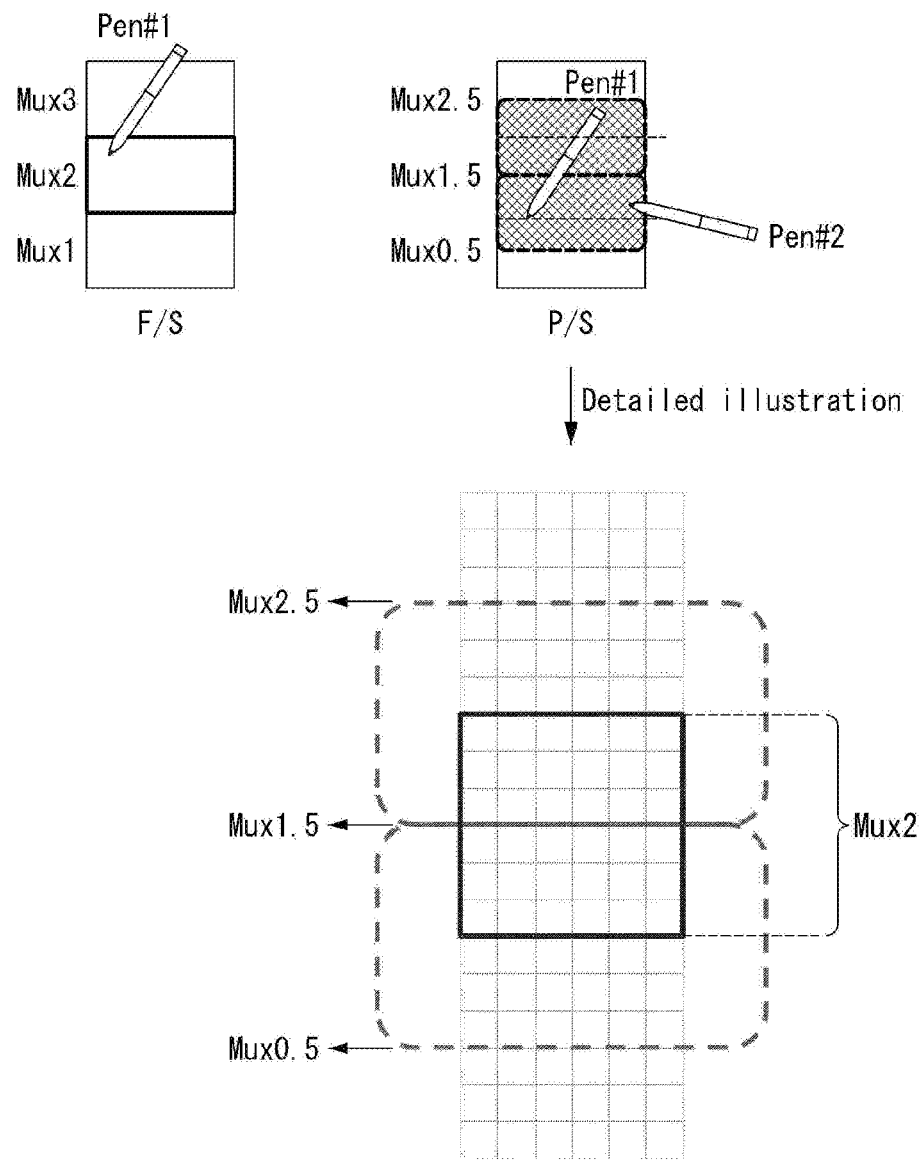
FIG. 17 is a view schematically showing sensing areas according to yet another aspect of the present disclosure.

FIG. 17 is a view schematically showing sensing areas according to yet another aspect of the present disclosure.

Referring to FIG. 17, the first touch input Pen #1 may be sensed in MUX2 through full sensing F/S, and then the touch sensing system may proceed to a local sensing period L/S to calculate the touch coordinates, without the second touch input Pen #2 being sensed.

Pre-sensing P/S is performed just prior to local sensing L/S. As shown in FIG. 17, a pre-sensing operation P/S according to yet another aspect of the present disclosure may be performed in such a way as to check for the presence of touch input in the area of MUX0.5 to MUX1.5 and the area of MUX1.5 to MUX2.5 by extending the touch sensing area with respect to MUX2 which is detected as having received the first touch input Pen #1 through full sensing F/S. This function of splitting a signal received by a MUX and detecting part of the signal may be implemented by employing Adaptive MUX control feature within ROIC (readout integrated circuit), which is a general technology, so a detailed description thereof will be omitted.

In yet another aspect of the present disclosure, in order to process three or more touch inputs Pen #1, Pen #2, and Pen #3, pre-sensing P/S is performed by varying the MUX configuration to the area of MUX1.5 to MUX2.5 and the area of MUX0.5 to MUX1.5. Therefore, the presence or absence of touch input can be sensed in as many MUXes as possible in the shortest time possible.

If the pre-sensing P/S result shows that the area of MUX0.5 to MUX1.5 and the area of MUX1.5 to MUX2.5 each have touch input, first local sensing L/S1 is performed on the area of MUX0.5 to MUX1.5 to output the coordinates of the first touch input Pen #1, and second local sensing L/Ω is performed on the area of MUX1.5 to MUX2.5 to output the coordinates of the second touch input Pen #2.

Figure 18:
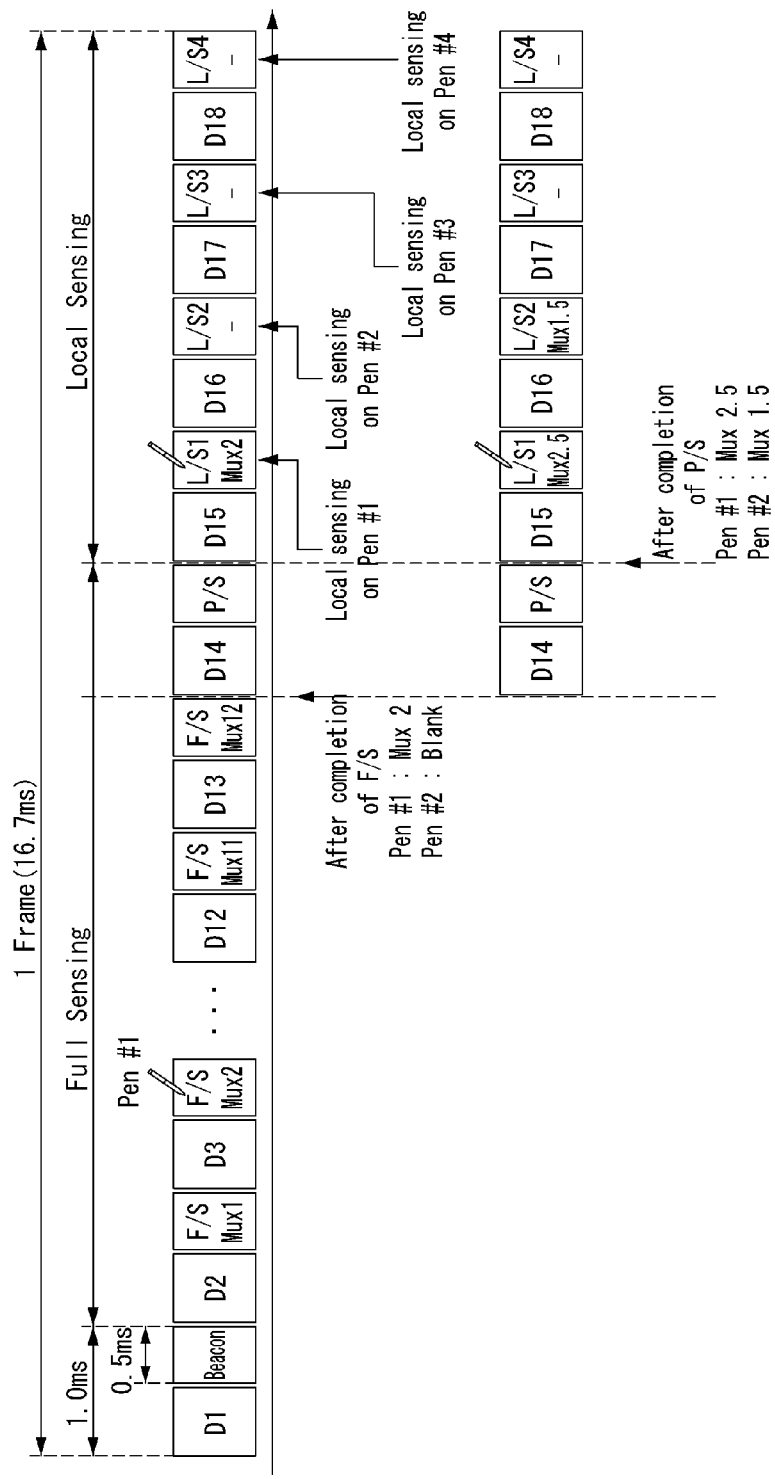
FIG. 18 is a view showing how 1 frame is time-divided into display driving periods and touch sensor driving periods according to yet another aspect of the present disclosure.

FIG. 18 is a view showing how 1 frame is time-divided into a display driving period and a touch sensor driving period according to yet another aspect of the present disclosure.

Referring to FIG. 18, in the touch sensing system, 1 frame is time-divided into one or more display periods D1 to D16 for driving the pixels and one or more touch sensor driving periods F/S, P/S, and L/S for driving the touch sensors. The touch sensing system drives the touch sensors during a touch period in response to an externally-input, touch enable signal Beacon.

The touch sensing system performs full sensing F/S first to sense the location of touch input within the entire touch area. Full sensing F/S may be performed across the entire touchscreen to sequentially find MUXes that have received touch input, from among MUX1, MUX2, . . . , MUX12.

Figure 19:
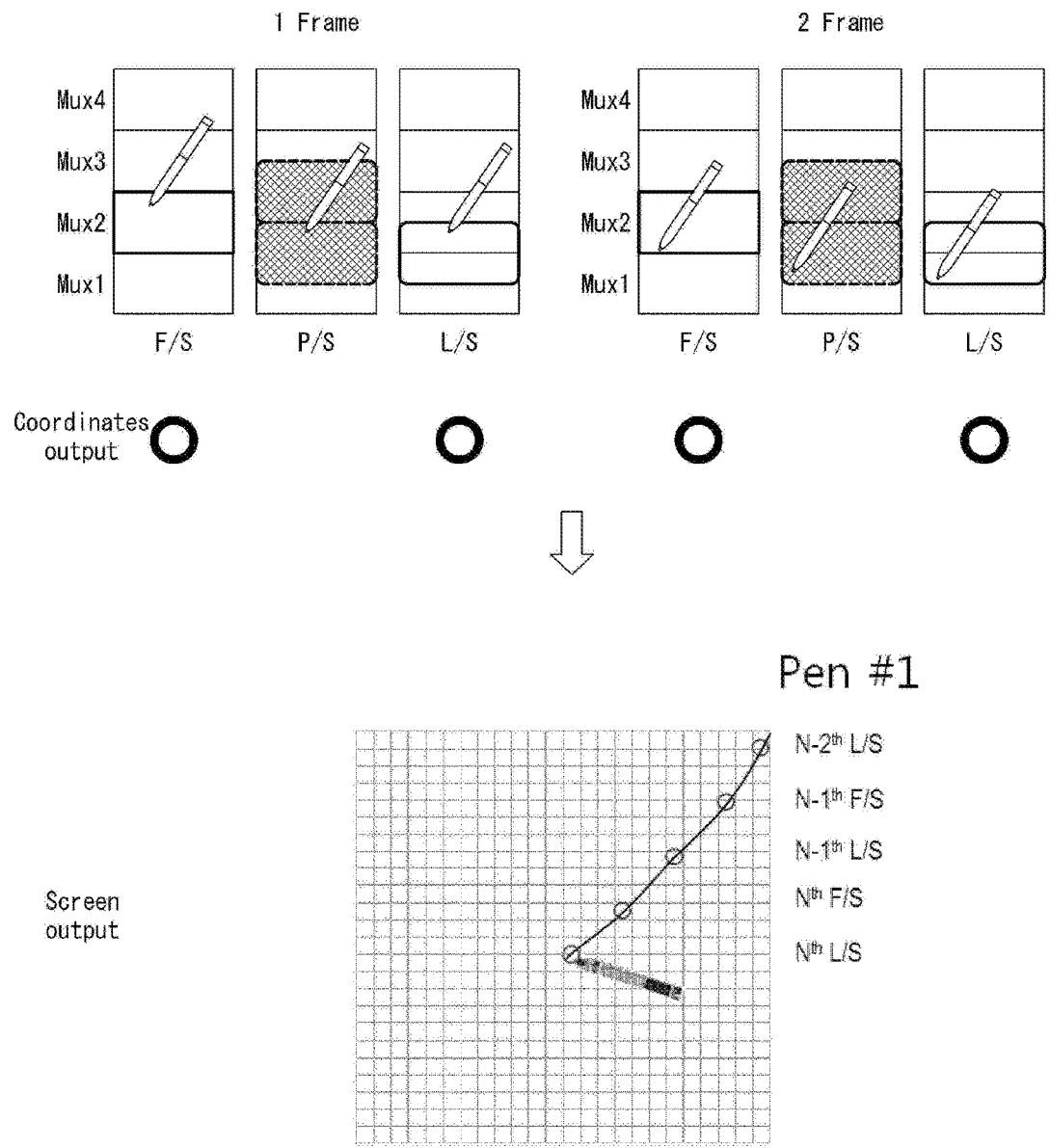
FIGS. 19 and 20 are views showing a screen output operation of the touch sensing system according to yet another aspect of the present disclosure.

The first touch input Pen #1 may be sensed through full sensing F/S, and then the touch sensing system may proceed to a local sensing period L/S to calculate the touch coordinates, without the second touch input Pen #2 being sensed. Referring to FIG. 19, pre-sensing P/S is performed just prior to local sensing L/S. A pre-sensing operation P/S according to yet another aspect of the present disclosure may be performed in such a way as to check for the presence of touch input in the area of MUX0.5 to MUX1.5 and the area of MUX1.5 to MUX2.5 by extending the touch sensing area with respect to MUX2 which is detected as having received the first touch input Pen #1 through full sensing F/S. After that, local sensing L/S may be performed on the area of MUX0.5 to MUX1.5 or area of MUX1.5 to MUX2.5 which has a sensed touch input, to thereby calculate the coordinates of the touch input.

Figure 20:
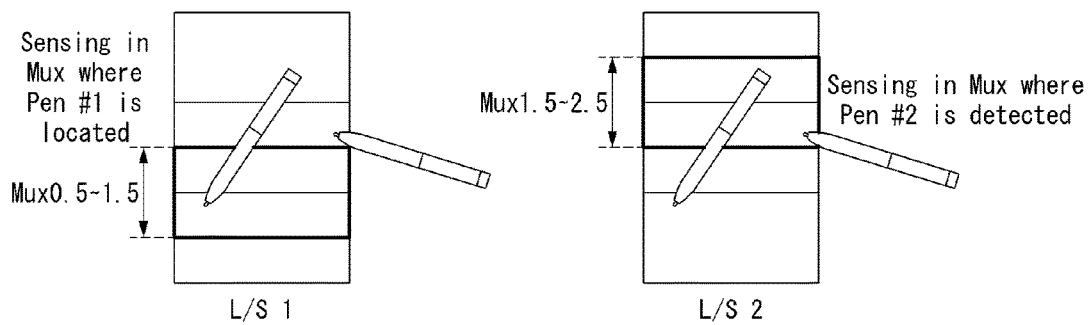

Meanwhile, the first touch input Pen #1 and the second touch input Pen #2 may be simultaneously sensed as a result of the pre-sensing P/S. For example, as shown in FIG. 20, the first touch input Pen #1 may be in the area of MUX0.5 to MUX1.5, and afterwards the second touch input Pen #2 may be detected in the area of MUX1.5 to MUX2.5. The locations of the touch inputs Pen #1 and Pen #2 may be accurately detected by receiving the pen IDs. After that, according to the pre-sensing P/S result, local sensing L/S may be performed on the area of MUX2.5 to output the coordinates of the first touch input Pen #1 and on the area of MUX1.5 to output the coordinates of the second touch input Pen #2.

Moreover, if multiple touch inputs Pen #1, Pen #2, Pen #3, and Pen #4, along with the pen IDs, are respectively detected in the MUXes as a result of the pre-sensing P/S, local sensing L/S may be performed on each MUX area, to thereby calculate the coordinates of the multiple touch inputs Pen #1, Pen #2, Pen #3, and Pen #4. For example, as shown in FIG. 18, the coordinates of the first touch input Pen #1 sensed in MUX2 may be calculated in a first local sensing period L/S1, the coordinates of the second touch input Pen #2 may be calculated in a second local sensing period L/S2, the coordinates of the third touch input Pen #3 may be calculated in a third local sensing period L/S3, and the coordinates of the fourth touch input Pen #4 may be calculated in a fourth local sensing period L/S4.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

What is claimed is:

1. A touch sensing system comprising:
    a display panel having pixels connected to data lines and gate lines and a plurality of touch sensors connected to the pixels;
    a display driving circuit writing data of an input image to the pixels during a plurality of display periods divided in 1 frame;
    a touch sensing part sensing a touch input by driving the plurality of touch sensors during
    a plurality of touch sensing periods within the 1 frame which are allocated in the plurality of display periods;
    a plurality of multiplexers connected between the touch sensing part and the tough sensors; and
    a touch sensor controller configure to perform full sensing to detect a multiplexer that senses the touch input by supplying a driving signal to the touch sensors within the touch sensing periods, configured to perform pre-sensing to determine if the touch input is sensed in multiplexers adjacent to the detected multplexer that senses the touch input, and configured to perform local sensing to scan the touch sensors connected to the multiplexer that senses the touch input based on a pre-sensing result and to calculate coordinates of the touch input.

2. The touch sensing system of claim 1, wherein the touch sensor controller performs pre-sensing to determine if the touch input is sensed in neighboring multiplexers on either side of the detected multiplexer that senses the touch input through the full sensing.

3. The touch sensing system of claim 2, wherein, if the pre-sensing result shows that no touch input is sensed in the neighboring multiplexers, the touch sensor controller performs the local sensing to scan the touch sensors connected to the detected multiplexer that sensed the touch input through the full sensing and to calculate the coordinates of the touch input, and if the pre-sensing result shows that a touch input is sensed in at least one of the neighboring multiplexers, the touch sensor controller performs the local sensing to scan the touch sensors connected to the detected multiplexer that sensed the touch input through the pre-sensing and to calculate the coordinates of the touch input.

4. The touch sensing system of claim 1, wherein the touch sensor controller performs pre-sensing to determine if a touch input is sensed in the detected multiplexer that sensed the touch input through the full sensing and in neighboring multiplexers that sensed the touch input.

5. The touch sensing system of claim 4, wherein, if the pre-sensing result shows that a touch input is sensed in two or more multiplexers, the touch sensor controller performs local sensing to scan the touch sensors connected to each of the multiplexers that sensed the touch input and to calculate the coordinates of the two or more touch inputs.

6. The touch sensing system of claim 1, wherein the touch sensor controller performs pre-sensing to determine if a touch input is sensed from a signal that is received by the detected multiplexer that sensed the touch input through the full sensing and neighboring multiplexers that sensed the touch input.

7. The touch sensing system of claim 6, wherein, if the pre-sensing result shows that a touch input is sensed in two or more multiplexers, the touch sensor controller performs local sensing to scan the touch sensors connected to the detected multiplexers that sensed the touch input through the pre-sensing.

8. The touch sensing system of claim 1, wherein the local sensing is performed with a minimum number of pulses during the pre-sensing period.

9. A touch sensing method, which writes data of an input image to pixels during a plurality of display periods divided in 1 frame, and senses a touch input by driving a plurality of touch sensors during a plurality of touch sensing periods within the 1 frame which are allocated between the display periods, the method comprising:
    performing full sensing to detect a multiplexer that sensed the touch input by supplying a driving signal to the plurality of touch sensors during the touch sensing periods;
    performing pre-sensing to determine if the touch input is sensed in multiplexers adjacent to the detected multiplexer that sensed the touch input; and
    performing local sensing to scan the plurality of touch sensors connected to the multiplexer that sensed the touch input based on a pre-sensing result and to calculate coordinates of the touch input.

10. The touch sensing method of claim 9, wherein the performing of local sensing comprises:
    if the pre-sensing result shows that no touch input is sensed in the adjacent multiplexers, scanning the touch sensors connected to the detected multiplexer that sensed the touch input through the full sensing and calculating the coordinates of the touch input; and
    if the pre-sensing result shows that a touch input is sensed in at least one of the adjacent multiplexers, scanning the touch sensors connected to the detected multiplexer that sensed the touch input through the pre-sensing and calculating the coordinates of the touch input.

11. A touch sensing system, comprising:
    a plurality of touch sensors disposed at a plurality of pixels;
    a touch sensing part sensing a touch input by driving the touch sensors during a plurality of touch sensing periods within the 1 frame allocated in the display periods;
    a plurality of multiplexers connected to the touch sensing part and the touch sensors, each multiplexer connected to the plurality of touch sensors; and
    a touch sensor controller performing full sensing to locate a first multiplexer that received a touch input corresponding to a sensing area during the touch sensing periods, performing pre-sensing to determine if second and third multiplexers adjacent to the first multiplexer received the touch input, and performing local sensing calculate coordinates of the sensing area corresponding to at least one of the first, second and third multiplexers that received the touch input.

12. The touch sensing system of claim 11, further comprising a plurality of sensor lines connecting the plurality of multiplexers and the plurality of touch sensors.

13. The touch sensing system of claim 11, wherein the first multiplexer that sensed the touch input is located by supplying a driving signal to the touch sensors.

14. The touch sensing system of claim 11, wherein the local sensing includes scanning the touch sensors connected to the at least one of the first, second and third multiplexers that sensed the touch input based on a pre-sensing result.

15. The touch sensing system of claim 14, wherein the touch sensors connected to the at least one of the first, second and third multiplexers that sensed the touch input are scanned through the pre-sensing if the touch input is sensed by two or more multiplexers.

16. The touch sensing system of claim 11, wherein the touch sensor controller performs to determine if the first multiplexer is received the touch input in addition to the second and third multiplexers.

17. The touch sensing system of claim 11, wherein the pre-sensing determines if a fourth multiplexer is received the touch input in addition to the first, second and third multiplexers.

18. The touch sensing system of claim 17, wherein the pre-sensing determines if adjacent two multiplexers are received the touch input.

19. The touch sensing system of claim 18, wherein the local-sensing calculates coordinates of the sensing area corresponding to at least a part of the adjacent two multiplexers that received the touch input.

20. The touch sensing system of claim 19, wherein the local-sensing calculates coordinates of the sensing area corresponding to three or more touch input.

* * * * *